United States Patent Office 3,480,614
Patented Nov. 25, 1969

3,480,614
KASUGANOBIOSAMINE DIMEDONE DERIVATIVES AND SALTS THEREOF
Martin John Cron, Fayetteville, and Robert Edward Smith, Syracuse, N.Y., assignors to Bristol-Myers Company, New York, N.Y., a corporation of Delaware
No Drawing. Filed Nov. 1, 1967, Ser. No. 679,631
Int. Cl. C07d 7/06; A61k 21/00
U.S. Cl. 260—210                          11 Claims

ABSTRACT OF THE DISCLOSURE

Semi-synthetic derivatives of kasugamycin have been found to possess substantially improved antibacterial properties. Most particularly the compound 5-[2-amino-2,3,4,6 - tetradeoxy - 4 - acetamidino - α - D - arabino-hexopyranosyl] - [1R:2S:3S:4R:5R:6R] - inositol has been found to be especially useful in the treatment of infectious diseases caused by gram-positive and gram-negative bacteria, most particularly those caused by the Pseudomonas genus.

BACKGROUND OF THE INVENTION

Field of the invention

The kasugamycin derivatives of the present invention are compounds particularly useful in the treatment of bacterial infections.

Description of the prior art

The novel compounds of the present invention are derivatives of the antibiotic kasugamycin which is itself commercially available in Japan and is described in Netherlands Patent 6,415,131 and by Hamao Umezawa et al. in Tetrahedron Letters No. 12, pp. 1239–1244 (1966) and the references given therein.

SUMMARY OF THE INVENTION

Compounds having the formula

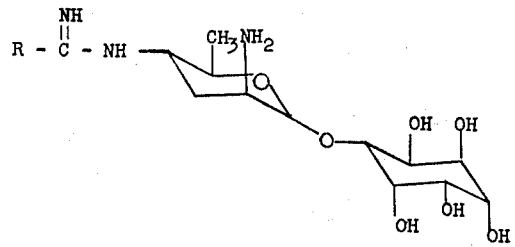

wherein R is (lower)alkyl; and the pharmaceutically acceptable nontoxic salts thereof are valuable antibacterial agents.

COMPLETE DISCLOSURE

This invention relates to new and useful antibiotic substances that are semi-synthetic derivatives of kasugamycin (U.S. Ser. No. 576,455, filed August 31, 1966, now Patent Number 3,358,001). More particularly, it relates to compounds having the formula

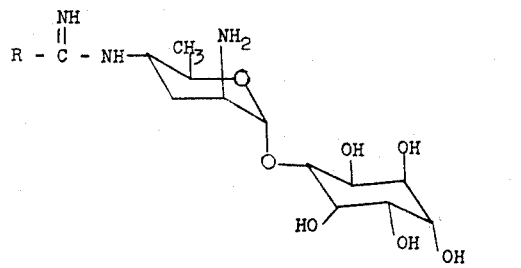

wherein R is hydrogen or a (lower)alkyl group including both branched and straight chain aliphatic hydrocarbon radicals having from one to ten carbon atoms such as methyl, ethyl, propyl, isopropyl, butyl, isobutyl, t-butyl, amyl, hexyl, etc., and including the pharmaceutically acceptable non-toxic acid addition salts thereof.

The nontoxic salts that are pharmaceutically acceptable include the hydrochlorides, hydrobromides, hydroiodides, (lower)alkylsulfates, (lower) alkyl and aryl sulfonates, phosphates, sulfates, maleates, fumarates, succinates, tartrates, citrates, and others commonly used in the art as salts of amines.

The parent antibiotic substance, kasugamycin, is an effective agent for use in the treatment of infections caused by a variety of bacteria, examples of which are pseudomonas, Klebsiella, Salmonella, Escherichia, Shigella and Brucella.

It was an object of the present invention to prepare derivatives of kasugamycin possessing increased antibiotic potency.

The new compounds of the present invention possess a similar spectrum of activity to that of kasugamycin but are substantially more potent.

The most preferred compound of the invention, for example, which has the Formula II,

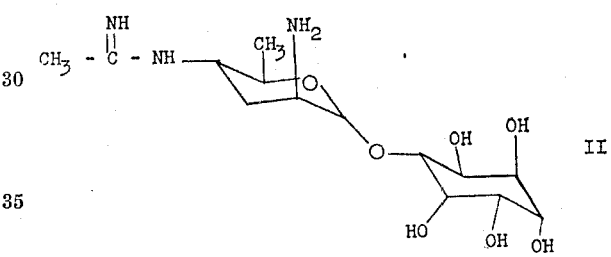

exhibits substantially more antibiotic activity against various bacteria than does its parent, kasugamycin.

Against 20 Pseudomonas strains, compound II was superior to kasugamycin in all cases. It was from two to eight times as active as kasugamycin and the actual range of Minimum Inhibitory Concentrations (MIC—$\mu$g./ml.) for compound II was 4 to 62 $\mu$g./ml.

Against 15 Klebsiella strains, compound II was superior to kasugamycin in all cases. It was two to eight times as active and the range of actual MIC values was from 2 to 62 $\mu$g./ml.

Against 30 Proteus strains, compound II was superior to kasugamycin in 14, equivalent in 7, and inferior in 9. In those strains where compound II was more active, the degree of improvement was from two to sixty-four times more active than gasugamycin. The actual range of MIC values was from 8 to 250 $\mu$g./ml.

Against 25 Salmonella strains, compound II was superior to kasugamycin in 18 and equivalent in 7. In the most sensitive strains, it was two to eight times as active and the range of the actual MIC's was from 16 to 500 $\mu$g./ml.

Against 40 Escherichia coli strains, compound II was superior to kasugamycin in 26, equivalent in 11 and inferior in 3.

In mice infected with a lethal does of Klebsiella pneumonia, the $CD_{50}$ (curative dose in 50% of the mice) was found to be 110 mg./kg. for compound II vs. >400 mg./kg. for kasugamycin. When the organism was Pseudomonas aeruginosa, the $CD_{50}$ for compound II was 160 mg./kg. vs. 350 mg./kg. for kasugamycin. The compounds were administered parenterally.

The compounds of the present invention are prepared by a process comprised of a series of consecutive steps:

STEP A

The dimedone derivative of kasugamycin (IV)

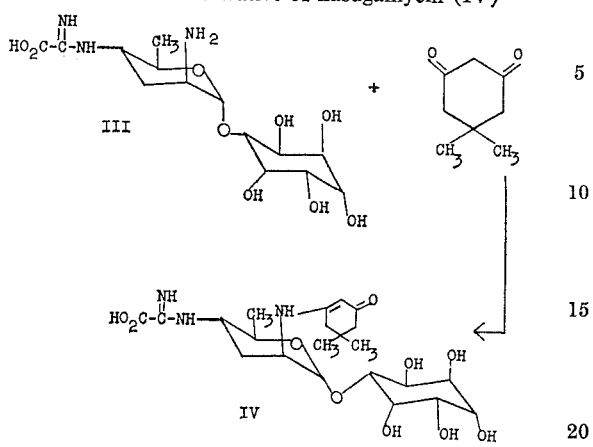

One mole of kasugamycin free base was dissolved in 4 liters of water. The resultant solution was filtered with the aid of a filtering agent to produce a clear solution. A solution of 1.6 moles of dimedone dissolved in 2 liters of methanol was added to the above solution. The pH dropped to about 6. The resultant solution was refluxed with stirring for a period of 3 to 24 hours. The product was cooled to 0° C. to 25° C. and a crystalline product was deposited. The crystals were collected, washed with water and acetone and dried. Recrystallization from a small volume of dimethylformamide and water produced the purified product referred to as kasugamycin dimedone (IV), M.P. 226–229° C.

STEP B

Kasuganobiosamine dimedone (V)

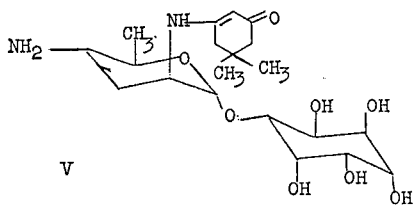

A 50 g. portion of kasugamycin dimedone was placed in a 2 liter round bottom flask and to it was added 850 ml. of saturated $Ba(OH)_2$ solution. The mixture was refluxed for 12 hours with vigorous stirring. The mixture was cooled and the insoluble barium oxalate precipitate removed by filtration. The filtrate was concentrated in vacuo to 300 ml. and an inorganic fraction precipitated by the addition of 200 ml. of ethanol. After removal of this precipitate, the mother liquors were concentrated in vacuo to near dryness and again diluted with ethanol until no more precipitate formed. The crystalline precipitate was collected by filtration and recrystallized by dissolving in a minimum of water and then diluting with ethanol. A yield of 22 grams of product was obtained as white needles, M.P. 235° C. with decomposition.

STEP C

Dimedone of 5-[2-amino-2,3,4,6-tetradeoxy-4-acetamidino-α-D-arabino-hexopyranosyl] - [1R:2S:3S:4R:5R:6R]-inositol. (VI)

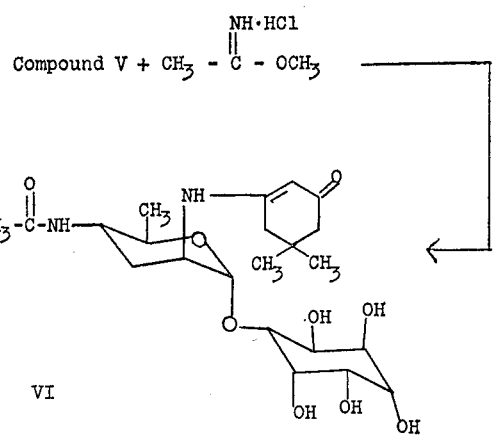

A 10 gram (23 mmole) portion of kasuganobiosamine dimedone (V) was added to 175 ml. of refluxing methanol. The pH was adjusted to 7.1 with methanolic HCl at which point complete solution was effected.

The solution was refluxed for a 48 hour period and during this time a total of 29 g. methyl acetimidate hydrochloride (266 mmoles) was added in about 12 small portions. After each addition methanolic sodium methoxide solution was added until a pH meter reading of 7.0–7.4 was obtained. The reaction mixture was then cooled, methanolic HCl added to a pH reading of 5.5 and the solution concentrated to a volume of 70 ml. The insoluble material was removed by filtering and discharged and the clear filtrate then concentrated in vacuo to dryness. The residue was dissolved in 100 ml. water and the solution then washed with three 100 ml. portions of $CHCl_3$. The dimedone of 5-[2-amino - 2,3,4,6 - tetradeoxy-4-acetamidino-α-D-arabino-hexopyranosyl]-[1R:2S:3S:4R:5R:6R] - inositol is contained in the aqueous solution. A sample was isolated and identified by NMR (nuclear magnetic resonance) and IR (infrared analysis).

STEP D

5-[2-amino - 2,3,4,6 - tetradeoxy-4-acetamidino-α-D-arabino-hexopyranosyl] - [1R:2S:3S:4R:5R:6R] - inositol (VII)

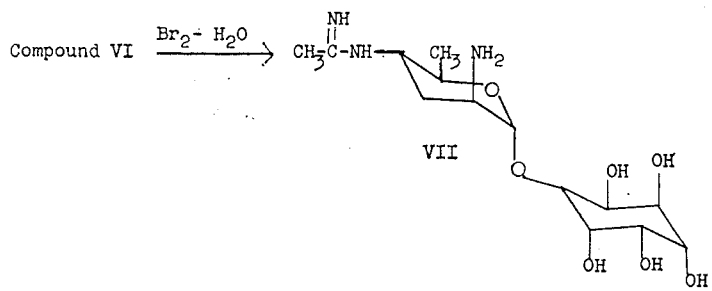

The aqueous solution of compound VI above was then concentrated in vacuo to a volume of 50 ml. and saturated bromine water was added with vogorous stirring until a yellow color persisted (about 150 ml. was required).

The solution was again filtered and the filtrate concentrated to dryness. The residue was dissolved in a mixture of 30 ml. methanol and 20 ml. ethanol, filtered to remove the insoluble fraction and the product precipitated by the addition of 300 ml. acetone. A yield of 9.0 g. was obtained. An 8.5 g. portion of this product dissolved in 20 ml. water was added to the top of a Dowex 50-4X (H+) 100–200 mesh column (2.5 cm. x 48 cm.). The column was washed with 700 ml. water and elution then started with 1.0 N HCl. The acid eluate was collected in 20–25 ml. cuts. Cuts numbered 15–60 were combined, neutralized to pH 4.0 by the addition of NaOH solution and then concentrated in vacuo to dryness. The residue was then leached with methanol and the solution again taken to dryness. During this concentration precipitated sodium chloride was removed by filtering two times. The residue was then dissolved in a minimum amount of a methanol-ethanol mixture, and acetone then added until a precipitate formed. A large excess of ether was then added to insure complete precipitation. The precipitated product was recoved by filtering, washed with ether and dried.

The product, identified by NMR and IR as 5-[2-amino-2,3,4,6 - tetradeoxy - 4 - acetamidino - α - D - arabino-hexopyranosyl] - [IR:2S:4R:5R:6R] - inositol, was isolated in a yield of 5.6 g., M.P. 153–192° C. with decomposition.

In Step A of the process, it is possible to employ other blocking groups to protect the 2-amino function of kasugamycin. These blocking groups include amongst others aliphatic and cyclic β-diketones. The cyclic compounds are particularly characterized by the formula:

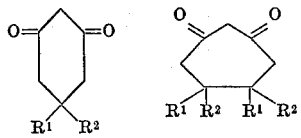

wherein $R^1$ and $R^2$ are alike or different and each is methyl, ethyl or hydrogen. The most preferred compound is dimedone.

The aliphatic β-diketones are characterized by the formula

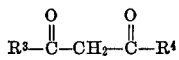

wherein $R^3$ and $R^4$ are alike or different and each is hydrogen or (lower)alkyl. Examples of these compounds are 2,4-pentanedione, 2,4-hexanedione, 6-methyl - 2,4-heptanedione, and the like.

A preferred embodiment of the present invention is the compound having the formula

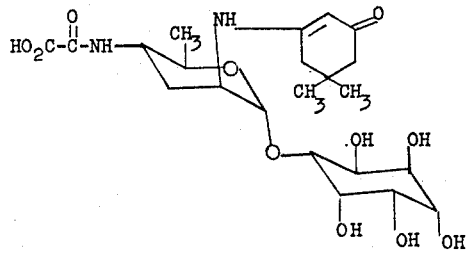

and the process for its preparation.

Another preferred embodiment of the present invention is the compound having the formula

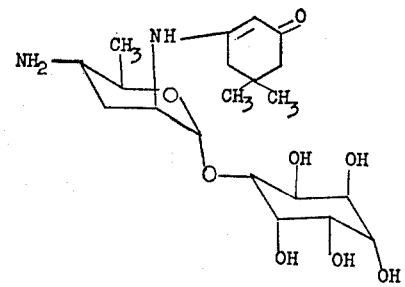

and the process for their preparation.

Another preferred embodiment of the present invention are the compounds having the formula

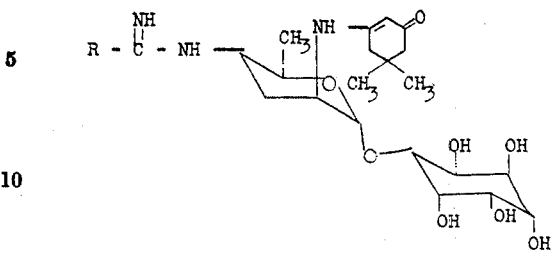

wherein R is (lower)alkyl; and the process for their preparation.

A most preferred embodiment of the present invention are the compounds having the formula

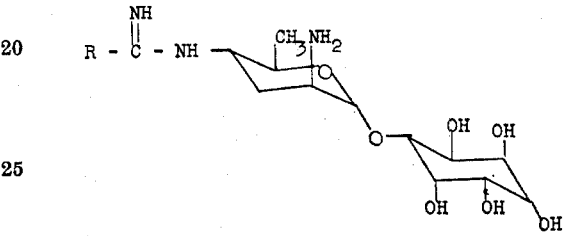

wherein R is (lower)alkyl; and the process for their preparation; and the pharmaceutically acceptable salts thereof.

The most preferred embodiment of the present invention is the compound having the formula

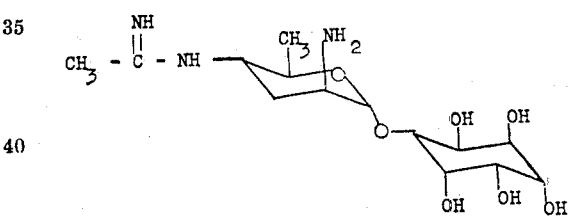

and the process for its preparation; and the pharmaceutically acceptable salts thereof.

The methyl acetimidate used in Step C was prepared by placing 40 ml. of acetonitrile (0.75 mole) in 40 ml. (1.0 mole) of dry methanol. The solution was cooled to ≤70° C. and saturated with dry hydrogen chloride gas. It was allowed to stand at 6° C. for several days and was then diluted with 50 ml. of dry ether. White crystals formed after several hours and were collected to yield 76 g. of methyl acetimidate hydrochloride. M.P. 95.0–95.5° C.

The other imidates employed herein are prepared in a substantially similar manner to that described above.

The objectives of the present invention have been achieved by the provision according to the present invention, of the process for the preparation of compounds having the formula

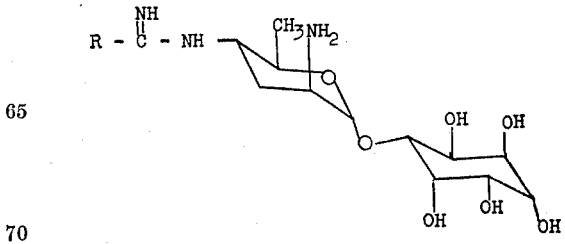

wherein R is (lower)alkyl, preferably methyl, and including the pharmaceutically acceptable nontoxic salts thereof; which process comprises the consecutive steps of;

(A) Mixing kasugamycin with a β-diketone, preferably dimedone, in a ratio of 1 mole of kasugamycin to 1 to 2 moles of the diketone, preferably with the aid of heat, and preferably at the reflux temperature of the solvent system, the solvent system being water or water-alcohol, but preferably 2:1 water-methanol, at a pH below about 7.5, but preferably in the range of about 6 to 7 to produce a product having the formula

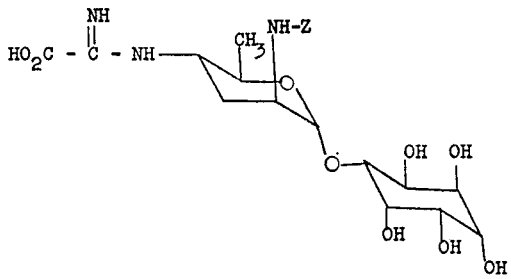

wherein Z is the ketonic residue of a Schiff base derived from a β-diketone having the formula

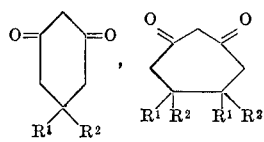

, or

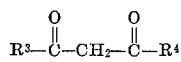

in which $R^1$, $R^2$, $R^3$ and $R^4$ are alike or different and each is hydrogen or (lower)alkyl, but Z is preferably

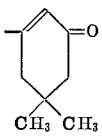

(B) Treating the resultant kasugamycin Schiff base with an excess of a saturated aqueous barium hydroxide solution with heating, preferably at reflux temperatures, to produce an amine having the formula

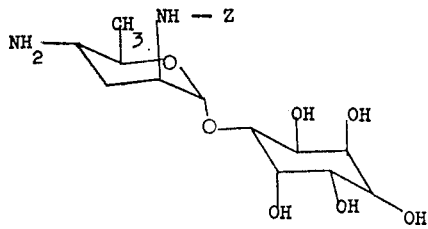

wherein Z is as defined above;

(C) Treating the above resultant amine with an imidate ester of the formula

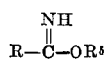

in which R and $R^5$ are (lower)alkyl, or the mineral acid salts thereof, in a refluxing alcohol, preferably methanol or ethanol, at a controlled pH of about 6.5 to 8.0, but preferably about 7.0 to 7.4, to produce a compound having the formula

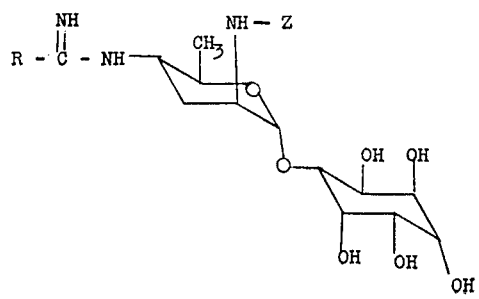

wherein R is (lower)alkyl and Z is as defined above; and (D) Mixing an aqueous solution of the above compound with an excess of saturated bromine water at about 0° C. to 40° C., but preferably at about room temperature to produce a compound having the formula

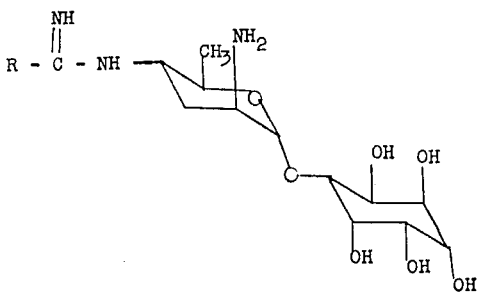

wherein R is (lower)alkyl.

The compounds of the present invention are assayed by two methods: turbidimetric and plate assays. The standard against which they are compared is kasugamycin hydrochloride having an assigned potency of 1000 microgram (μg.) per milligram (mg.). The assay organism is *Escherichia coli* 1559.

TURBIDIMETRIC ASSAY PROCEDURE

Materials (reagents: 10% Formalin solution; 20% w./v. NaOH solution; assay media (broth)):

| | | |
|---|---|---|
| Gelysate | gm | 10 |
| Yeast extract | gm | 5 |
| Trypticase | gm | 10 |
| Dextrose | gm | 5 |
| Distilled water | ml | 1000 |

*Note.*—The dextrose is prepared separately as a 50% solution w./v. and is added after the media has been autoclaved. The pH is adjusted to 8.2 with 20% NaOH just prior to using the broth. Test organism: *Escherichia coli* 1559. Apparatus: suitable colorimeter.

Preparation of test suspension

Maintain *Escherichia coli* 1559 on seed agar. Inoculate 100 ml. of sterile broth with one loopful of *E. coli* and incubate at 37° C. for 18 hours. The suspension should have an optical density of approximately 1.0 at this time. Use 10 ml. of the suspension per liter of assay broth.

Preparation of the standard curve

Prepare a stock solution of kasugamycin hydrochloride standard powder in distilled water to contain one milligram per ml. of activity. This stock solution must be prepared fresh daily. To eight 50 ml. volumetric flasks, add 2, 3, 4, 5, 6, 7, 8 and 9 ml. of the stock solution. Bring these flasks to volume with distilled water. These eight solutions contain 40, 60, 80, 100, 120, 140, 160 and 180 mcg./ml. and constitute the points on the standard curve. To each of three culture tubes (16×100 mm.), add 1 ml. of the 40 mcg./ml. solution. Repeat this procedure with the other concentrations. Add to each culture tube 9 ml. of broth which has been inoculated with the test organism. Place all tubes in a 37° C. water bath.

Preparation of samples (kasugamycin derivatives

Dissolve all samples in distilled water and dilute to an estimated concentration of 100 mcg./ml. Pipette 1 ml. of the estimated 100 mcg./ml. solution to each of three culture tubes and 9 ml. of inoculated broth respectively. If the prepared tubes show a color different or more intense than is evident in the standard tubes, include a fourth tube in the sample preparation. To the fourth tube, add 3.5 ml. of 10% formalin. This tube is set aside as the sample blank. The remaining tubes are placed in a 37° C. water bath.

Incubaton and reading

After approximately 2½ hours incubation, obtain a colorimeter reading on one tube of the 100 mcg./ml. concentration of the standard curve. If this check tube reads 0.250 optical density (O.D.) or lower, sufficient growth has taken place and all tubes should be removed from the water bath. Add 0.5 ml. of a 10% solution of formalin to all tubes to stop growth of the organism.

Use a 5300 A filter in the colorimeter and standardize with inoculated assay broth. Plot the average O.D. readings of the three tubes at each concentration of the standard curve on arithmetic graph paper. The 100 mcg./ml. concentration is the center and reference point.

Obtain the average optical density of the three tubes on each unknown and record. Then obtain the O.D. of each of the sample blanks and deduct this reading from the O.D. on the sample. Read the corrected O.D. on the graph to obtain the final concentration in the diluted sample. Multiply this concentration by the dilution to obtain the potency of the sample.

Plate assay procedure

The design of the assay for kasugamycin hydrochloride is similar to that for streptomycin and dihydrostreptomycin as reported in "Assay Methods of Antibiotics—A Laboratory Manual," by Donald C. Grove and William A. Randall (Medical Encyclopedia, Inc., New York, 1955).

Culture medium

| | |
|---|---|
| $K_2HPO_4$ | gm 7 |
| $KH_2PO_4$ | gm 2 |
| Sodium citrate·$2H_2O$ | gm 0.5 |
| $(NH_4)_2SO_4$ | gm 1 |
| Distilled $H_2O$ | ml 1000 |
| Agar | gm 25 |

Autoclave for twenty minutes at 15 pounds pressure, then before the agar medium is poured into the petri dishes, add 25 ml. per liter of a separately sterilized 20% glucose solution, 10 ml. per liter of a separately sterilized 1% solution of $MgSO_4 \cdot 7H_2O$ and 1.2 ml. per liter of a 2.5% solution of triphenyltetrazolium chloride. The tetrazolium serves as an indicator of growth through its reduced form which is a red color. This medium is poured in a thin layer of 11 ml. per 8 cm. diameter petri dish.

Test organism

The test organism is a suspension of *Escherichia coli* A 15,010 (Squibb No. 1559). The culture is grown in Roux bottles on the surface of Seed Agar for 24 hours at 37° C. The growth from each Roux bottle is washed off with 10 ml. of sterile saline. This suspension is then used to inoculate the culture medium used for the plates.

Standard curve

The stock standard of kasugamycin is accurately weighed and diluted in 0.1 mole potassium phosphate buffer (pH 7.0) to give concentrations of 100, 80, 50, 30 and 20 μg./ml.

Assay of derivatives

All the kasugamycin derivatives of the present invention are assayed in a similar manner and are compared to kasugamycin which is assigned a potency of 1000 μg./mg.

In the treatment of bacterial infections in mammals, including man, the compounds of this invention are administered topically, orally and parenterally, but preferably parenterally, in accordance with conventional procedures for antibiotic administration in an amount of from about 10 to 250 mg./kg./day and preferably in the range of 75 to 150 mg./kg./day for Pseudomonas infections in divided dosages, e.g., three or four times a day. They are administered in dosage units containing, for example, 250, 500, 1000 and 2000 mg. of active ingredient with suitable physiologically acceptable carriers or excipients. The dosage units can be in the form of liquid preparations such as solutions, dispersions, emulsions or in solid form such a tablets, capsules, etc.

The following examples will serve to illustrate this invention without limiting it thereto.

DESCRIPTION OF THE PREFERRED EMBODIMENTS

The products of the present invention are characteristically isolated as hydrates and solvates. As such the elemental analyses are often poor and may be calculated as solvates or hydrates.

Example 1.—Preparation of kasugamycin dimedone

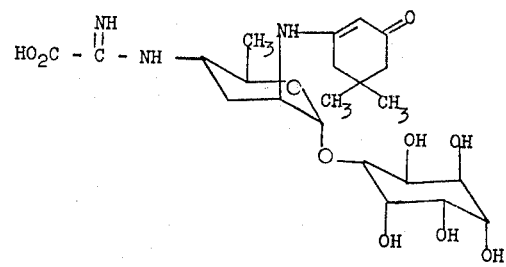

A 3.72 g. portion (27 mmoles) of dimedone was dissolved in 20 ml. of methanol-water 3:1 by warming (pH about 3.5). To this solution was added a solution of 10 g. of kasugamycin free base (27 mmoles) in 100 ml. of water and the mixture heated on a steam bath with stirring for 3 hours. The reaction mixture was then cooled to 6° C. for one hour and the crystalline product which formed was recovered by filtering. The solid was washed with water, then acetone, following which it was dried. The product was recrystallized by dissolving in a small volume of dimethyl formamide with warming and then diluting with water. The recrystallized product amounted to 5.21 g., M.P. 226–229° C. with decomposition. The product was a mixture of hydrates and analyzed for a product containing about 2.5 molecules of water.

*Analysis.*—Calculated for $C_{22}H_{35}O_{10}N_3 \cdot 2.5H_2O$: C, 48.34%; H, 7.37%; N, 7.69%. Found: 48.28%; H, 7.38%; N, 7.83%.

Example 2.—Preparation of kasugamycin dimedone

Kasugamycin hydrochloride (225 g., 0.54 moles) was dissolved in 2 liters of water. The pH, which was 4.5, was adjusted to pH 8.5 with 10% sodium hydroxide. The mixture was heated to 60° C. and 1 liter of methanol was added. To the resultant solution was added 118 g. (0.84 mole) of dimedone. The pH was about 6.0. The solution was heated overnight on a steam bath for about 18 hours. The solution was concentrated to about 2 liters on a steam bath at atmospheric pressure. The product crystallized on cooling, was collected by filtration, and washed with water. The yield was 270 g. (~ 100%), M.P. 223°–226° C.

Example 3.—Preparation of kasugamycin dimedone

Kasugamycin hydrochloride (4.155 kg.) was dissolved in 40 liters of water. The pH was adjusted to pH 8.4–8.6 with sodium hydroxide. The solution was filtered with the aid of a filtering aid. A solution of 2.243 kg. of dimedone in 20 liters of methanol (pH ~3.5) was added to the solution of kasugamycin. The pH dropped to about 6.0. The solution was refluxed about 18 hours with atmospheric steam. The pot temperature was about 80–85° C. The product started to crystallize after 2 to 3 hours. After the 18 hours of refluxing, the mixture was cooled to about 10° C. The product was collected by filtration. The solid was washed with water, then acetone to yield about 3.5 to 4 kg. of desired product.

Example 4.—Prepartion of kasuganobiosamine dimedone

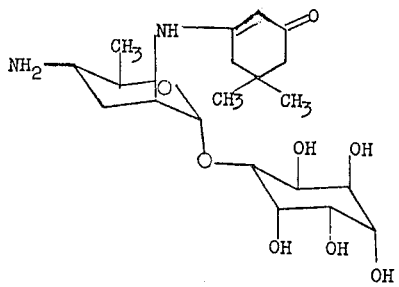

A 50 g. portion of kasugamycin dimedone was placed in a 2 liter round-bottom flask and to it was added 850 ml. saturated Ba(OH)$_2$ solution. The mixture was refluxed for 12 hours with vigorous stirring. The mixture was then cooled and the insoluble barium oxalate precipitate removed by filtering and discarded. The filtrate was then concentrated in vacuo to a volume of 300 ml. and an inorganic fraction precipitated by the addition of 200 ml. ethanol. After removal of the precipitate by filtering, the mother liquor was concentrated almost to dryness and again diluted with ethanol until no more precipitate formed. The crystalline product was recovered and recrystallized by dissolving it in a minimum quantity of water. Methanol was added until the solution hazed. The solution was further diluted with acetone and ether. Crystal formed and were collected to give 22.0 g. of product, M.P. 195°–235° C. with decomposition. The product was an acetone solvate. The NMR and IR were consistant with the structure proposed.

Analysis.—Calculated for $C_{20}H_{34}O_8N_2 \cdot CH_3COCH_3$: C, 56.54%; H, 8.25%; N, 5.73%. Found: C, 56.79%; H, 8.34%; N, 6.11%.

Reference.—Halpern & Cross, Chemistry & Industry, June 26, 1965, p. 1183. Halpern & James, Nature, vol. 202, p. 592 (1964).

Example 5.—Preparation of kasuganobiosamine dimedone

The 270 g. of kasugamycin dimedone obtained in Example 2 was dissolved in 4.5 liters of saturated barium hydroxide solution and refluxed for a period of time of about 20 hours. The mixture was cooled and the solid barium oxalate formed was removed by filtration. The resultant solution was titrated to pH 7 with ~15% sulfuric acid and the resultant barium sulfate removed by filtration. The filtrate was concentrated to dryness, then azeotroped with ethanol or butanol several times to remove the last traces of water. The yield was 134 g. (68%) of the product, kasuganobiosamine dimedone, M.P. 220–235° C. with decomposition, and was identical with the product obtained in Example 4.

Example 6.—Preparation of kasuganobiosamine dimedone

One kilogram of kasugamycin dimedone from Example 3 was added to a mixture comprised of 1.25 kg. of barium hydroxide octahydrate in 10 liters of water. The resultant mixture was refluxed with stirring for 2 hours and then cooled to 10° C. The insoluble barium compounds were filtered off and washed with water. The filtrates were adjusted to pH 8.5–9.0 and filtered again to remove barium solids. The pH of the filtrate was adjusted to pH 10.9–11.1 with sodium hydroxide and the filtrate concentrated under vacuum. The concentrated solution was repeatedly azeotroped with butanol until the water was removed. The butanol slurry was cooled to 20–25° C. and the sodium sulfate solids removed by filtration. The solids were washed with dry butanol and the wash added to the mother liquors. The combine butanol filtrate was diluted with 4 volumes of acetone and the product allowed to crystallize for 6 hours at 10°–15° C. The crystals were collected by filtration, washed with acetone and dried. The product was identical to that obtained in Example 4.

Example 7.—Preparation of methyl acetamidate hydrochloride

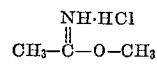

A 40 ml. portion of acetonitrile (0.75 mole) was added to 40 ml. of dry methanol (1.0 mole) in a 500 ml. round bottomed flask and cooled to −70° C. The solution was then saturated with dry HCl. It was placed in an ice bath for two hours and then allowed to stand for 3 days at 6° C. A 50 ml. portion of ether was then added and after further standing for 4 hours the crystalline product was recovered by filtering, washing with ether and drying in a desiccator over NaOH pellets. A yield of 76 g. was obtained; M.P. 95.0–95.5° C.

Example 8.—Preparation of the dimedone of 5-[2-amino-2,3,4,6 - tetradeoxy - 4 - acetamidino-α-D-arabino-hexopyranosyl]-[1R:2S:3S:4R:5R:6R]-inositol

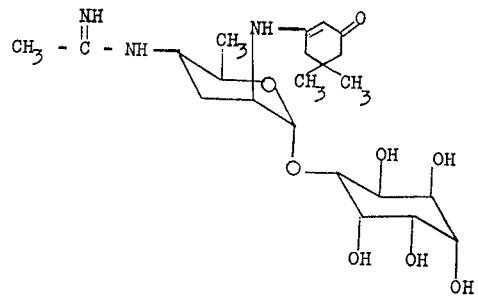

A 10 g. portion of kasuganobiosamine dimedone (23 mmoles) was added to 175 ml. of refluxing methanol. The pH was adjusted to 7.1 with methanolic HCl at which point complete solution was effected. The solution was refluxed for a 48 hour period and during this time a total of 29 g. methyl acetimidate hydrochloride (266 mmoles) was added in about 12 small portions. After each addition methanolic sodium methoxide solution was added until a pH meter reading of 7.0–7.4 was obtained. The reaction mixture was then cooled, methanolic HCl added to a pH reading of 5.5 and the solution concentrated to a volume of 70 ml. The insoluble material was removed by filtering and discarded and the clear filtrate then concentrated in vacuo to dryness. The residue was identified as the desired product, the dimedone derivative of 5-[2-amino - 2,3,4,6 - tetradeoxy - 4-acetamidino-α-D-arabino-hexopyranosyl]-[1R:2S:3S:4R:5R:6R]-inositol, by NMR and IR analysis.

The nomenclature for the above named product is according to that proposed by Cahn-Ingold-Prelog, Experentia, vol. 12, p. 81 (1956).

Example 9.—Preparation of the dimedone of 5-[2-amino-2,3,4,6 - tetradeoxy - 4-acetamidino-α-D-arabino-hexopyranosyl]-[1R:2S:3S:4R:5R:6R]-inositol Kasuganobiosamine dimedone (30 g., 0.07 mole) was placed in 525 ml. of dry methanol and heated to reflux. Solution was incomplete so sufficient dry hydrochloric acid in methanol was added to make the pH 6. Complete solution occurred. The solution was refluxed for 48 hours during which time a total of 46 g. of methyl acetimidate hydrochloride was added in divided portions. After each addition the pH was adjusted to pH 6–6.2 with sodium methoxide in methanol. The pH was maintained at about 6 throughout the reflux time. At the end of 48 hours, the pH was adjusted to 5–5.4 with concentrated hydrochloric acid and the solvents were evaporated in vacuo. The organic residue was determined to be identical to the product obtained in Example 8.

Example 10.—Preparation of 5-[2-amino-2,3,4,6-tetradeoxy-4-acetamidino-α-D-arabino-hexopyranosyl] - [1R:2S:3S:4R:5R:6R]-inositol

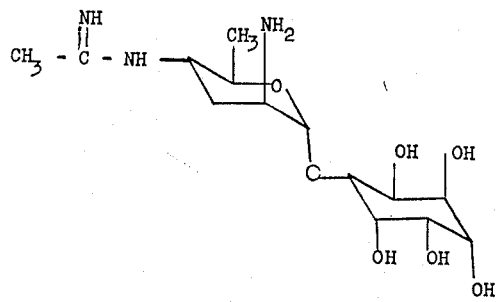

The residue obtained from Example 8 identified as 5 - [2 - amino - 2,3,4,6 - tetradeoxy - 4 - acetamidino - α - D - arabino - hexopyranosyl] - [1R:2S:3S:4R:5R:6R]-inositol dimedone, was dissolved in 100 ml. of water and the solution was then washed with three 100 ml. portions of chloroform. The aqueous solution was concentrated in vacuo to 50 ml. and saturated bromine water was added with vigorous stirring until a yellow color persisted (about 150 ml.). The solution was again filtered to remove the precipitated 2,2-dibromodimedone formed as a by-product and the resultant mother liquors were taken to dryness in vacuo. The residue was dissolved in a mixture of 30 ml. methanol and 20 ml. ethanol, filtered to remove the insoluble fraction and the product precipitated by the addition of 300 ml. acetone. A yield of 9.0 g. was obtained. An 8.5 g. portion of this product dissolved in 20 ml. water was added to the top of a Dowex 50–4X (H+) 100–200 mesh column (2.5 cm. x 48 cm.). The column was washed with 700 ml. water and elution then started with 1.0 N HCl. The acid eluate was collected in 20–25 ml. cuts. Cuts numbered 15–60 were combined, neutralized to pH 4.0 by the addition of NaOH solution and then concentrated in vacuo to dryness. The residue was then leached with methanol and the solution again taken to dryness. During this concentration precipitated sodium chloride was removed by filtering two times. The residue was then dissolved in a minimum amount of a methanol-ethanol mixture, the acetone was added until a precipitate formed. A large excess of ether was then added to insure complete precipitation. The precipitated product was recovered by filtering, washed with ether and dried to yield 5.6 g. of the desired title product, M.P. 153–192° C. with decomposition. The NMR analysis was consistent with the proposed structure. Plate assay 390 μg./mg. Turbidimetric assay: 4950 μg./mg.

Example 11.—Preparation of 5-[2-amino-2,3,4,6-tetradeoxy - 4 - acetamidino - α - D - arabino - hexopyranosyl]-[1R:2S:3S:4R:5R:6R]-inositol The organic residue obtained in Example 9 was dissolved in 150 ml. of water. To this mixture was added 700 ml. of saturated bromine water with rapid stirring. Three additional 700 ml. portions were added. The solution was stirred at 25° C. for about 20 hours. The precipitate that formed, 2,2-dibromodimedone, was filtered off and the mother liquors taken to dryness.

The residue was extracted with 20 ml. of methanol. The product was dissolved in excess ethanol and then concentrated to about 50 ml. Excess acetone was added to precipitate the product. The product was collected by filtration, then washed with acetone. After vacuum drying, a yield of 22.6 g. (0.054 mole), 77%, of the title product was obtained as the dihydrochloride.

The dihydrochloride was crystallized as the monohydrochloride by dissolving 5.0 g. of the compound in 100 ml. of water (pH 3.8) and treating the solution with Dowex-1 4X (hydroxide form -quaternary ammonium function anion exchange resin of Type 1 according to Dow Chemical literature) until the pH was 10. The Dowex was removed by filtration and the filtrate was taken to near dryness in vacuo at 50° C. Ethanol was added to give partial solution, and then methanol was added to produce complete solution. Concentration produced a white granular solid which after vacuum drying weighed 2.4 g., M.P. 184–191° C. with decomposition. Turbidimetric assay, 5600 μg./mg.; plate assay, 780 μg./mg.

*Analysis.*—Calculated for $C_{14}H_{27}O_7N_3 \cdot HCl \cdot 2H_2O$: C, 39.86%; H, 7.65%; N, 9.96%; Cl, 8.40%; $H_2O$, 8.55%. Found: C, 40.57%; H, 7.32%; N, 10.38%; Cl, 8.28%, $H_2O$ (Karl Fisher), 9.12%.

Example 12.—Preparation of isobutyl formimidate

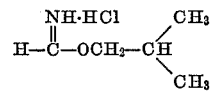

A combination of 20 ml. of formamide, 50 ml. of isobutyl chloroformate and 45 ml. of benzene were placed in a 500 ml. round bottom flask with stirring. The mixture was stirred at room temperature for 18 hours. A combination of white crystals and an oil formed. Ether (200 ml.) was added and the supernatant decanted. The procedure was repeated once. Chloroform (100 ml.) was added and the solid become filterable. The solids were dried in a vacuum oven at 30° C. to yield 18.8 g. (28%) of the isobutyl formimidate hydrochloride.

Reference.—Wilhelm Hechelhammer, German Patent 948,973; Chemical Abstracts 53, 6088 (1959).

Example 13.—Preparation of the dimedone of 5-[2-amino - 2,3,4,6 - tetradeoxy - 4 - formamidino - α - D-arabino - hexopyranosyl] - [1R:2S:3S:4R:5R:6R]-inositol

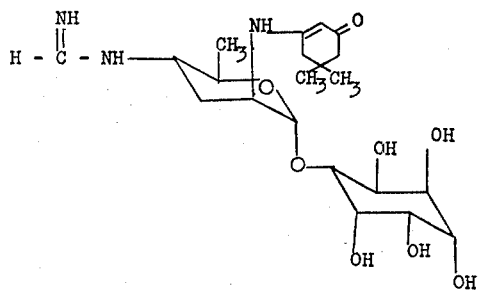

Substitution in the procedure of Example 8 for the methyl acetimidate hydrochloride used therein of isobutyl formimidate hydrochloride produced the desired product, 5 - [2 - amino - 2,3,4,6 - tetradeoxy - 4 - formamidino - α - D - arabino - hexopyranosyl] - [1R:2S:3S:4R:5R:6R]-inositol dimedone. The NMR and IR were consistent with the proposed structure.

Example 14.—Preparation of 5-[2-amino-2,3,4,6-tetradeoxy - 4 - formamidino - α - D - arabino - hexopyranosyl]-[1R:2S:3S:4R:5R:6R]-inositol

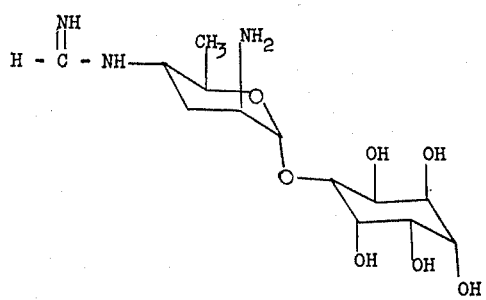

Substitution in the procedure of Example 9 for the 5 - [2 - amino - 2,3,4,6 - tetradeoxy - 4 - acetamidino - α-D - arabino - hexopyranosyl]-[1R:2S:3S:4R:5R:6R]-inositol dimedone used therein of 5-[2-amino-2,3,4,6-tetradoxy - 4 - formamidino - α - D - arabino - hexopyranosyl]-[1R:2S:3S:4R:5R:6R]-inositol dimedone produced 5 - [2 - amino - 2,3,4,6 - tetradeoxy - 4 - formamidino - α-D - arabino - hexopyranosyl] - [1R:2S:3S:4R:5R:6R]-inositol. Turbidimetric assay—1500 μg./mg. Plate assay—190 μg./ml. The NMR and IR were consistent with the proposed structure.

Example 15.—Preparation of methyl propionimidate

Substitution in the procedure of Example 7 for the acetonitrile used therein of propionitrile produced methyl propioimidate hydrochloride.

Example 16.—Preparation of 5-[2-amino-2,3,4,6-tetradeoxy - 4 - propionamidino-α-D-arabino-hexopyranosyl]-[1R:2S:3S:4R:5R:6R]-inositol dimedone

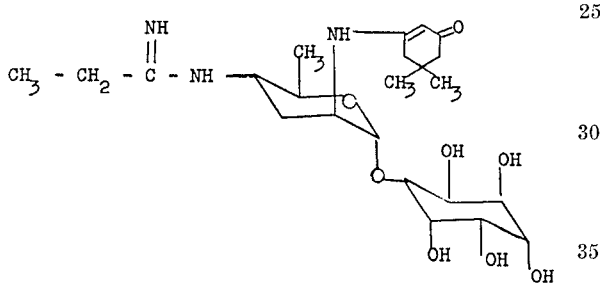

Substitution in the procedure of Example 8 for the methyl acetimidate hydrochloride used therein of methyl propioimidate hydrochloride produced 5-[2-amino-2,3,4,6-tetradeoxy-4-propioamidino - α - D - arabino-hexopyranosyl]-[1R:2S:3S:4R:5R:6R]-inositol dimedone. The NMR and IR were consistent with the proposed structure.

Example 17.—Preparation of 5-[2-amino-2,3,4,6-tetradeoxy - 4 - propionamidino-α-D-arabino-hexopyranosyl]-[1R:2S:3S:4R:5R:6R]-inositol

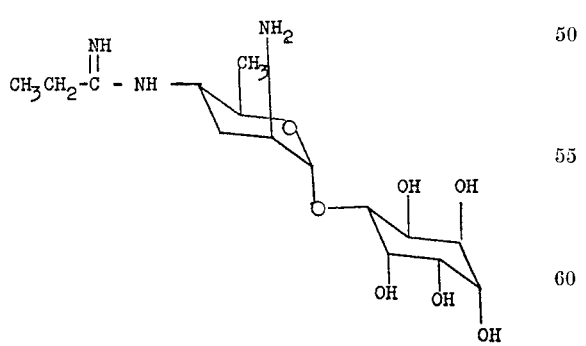

Substitution in the procedure of Example 9 for the 5-[2-amino-2,3,4,6-tetradeoxy-4-acetamidino-α-D-arabino-hexopyranosyl]-[1R:2S:3S:4R:5R:6R]-inositol dimedone used therein of 5-[2-amino-2,3,4,6-tetradeoxy-4-propionamidino - α - D - arabino-hexopyranosyl]-[1R:2S:3S:4R:5R:6R]-inositol dimedone produced 5-[2-amino-2,3,4,6-tetradeoxy-4-propionamidino - α - D - arabino-hexopyranosyl]-[1R:2S:3S:4R:5R:6R]-inositol. Turbidimetric assay 690 μg./ml. Plate assay 61 μg./ml.

The NMR and IR were consistent with the proposed structure.

Example 18.—Preparation of the 2,4-pentanedione Schiff base of Kasugamycin

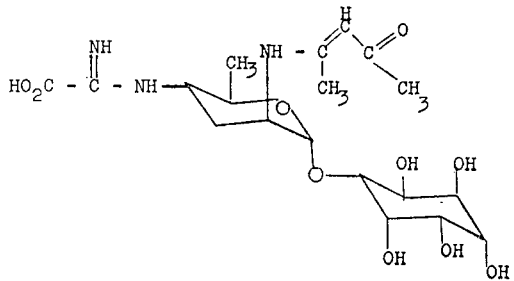

Substitution in the procedure of Examples 1, 2 or 3 for the dimedone used therein of an equimolar quantity of 2,4-pentanedione produces the 2,4-pentanedine Schiff base of kasugamycin.

Example 19.—Preparation of the 2,4-Pentanedione Schiff base of kasuganobiosamine

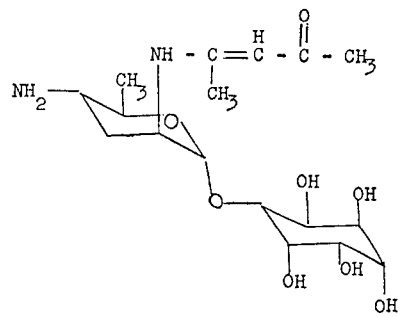

Substitution in the procedure of Examples 4, 5 or 6 for the kasugamycin dimedone used therein of the 2,4-pentanedione Schiff base of kasugamycin produces the 2,4-pentanedione Schiff base of kasuganobiosamine Example 20.—Preparation of the 2,4-pentanedione Schiff base of 5-[2-amino-2,3,4,6-tetradeoxy-4-acetamidino-α-D-arabino - hexopyranosyl] - [1R:2S:3S:4R:5R:6R]-inositol

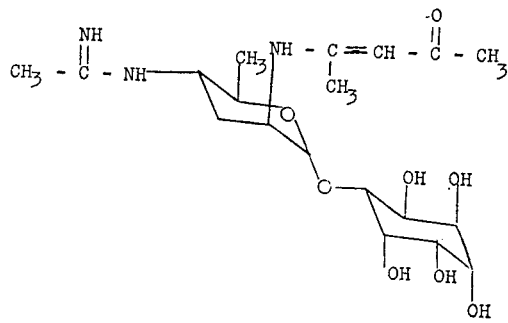

Substitution in the procedure of Example 8 for the kasuganobiosamine dimedone used therein of the 2,4-pentanedione Schiff base of kasuganobiosamine produces the 2,4-pentanedione Schiff base of 5-[2-amino-2,3,4,6-tetradeoxy - 4 - acetamidino-α-D-arabino-hexopyranosyl]-[1R:2S:3S:4R:5R:6R]-inositol.

Example 21.—Preparation of 5-[amino-2,3,4,6-tetradeoxy - 4 - acetamidino - α - D - arabino-hexopyranosyl]-[1R:2S:3S:4R:5R:6R]-inositol Substitution in the procedure of Example 10 for the 5-[2-amino-2,3,4,6-tetradeoxy - 4 - acetamidino-α-D-arabino - hexopyranosyl] - [1R:2S:3S:4R:5R:6R] - inositol dimedone used therein of the 2,4-pentanedione Schiff base of 5-[2-amino-2,3,4,6-tetradeoxy-4-acetamidino-α-D-arabino-hexopyranosyl]-[1R:2S:3S:4R:5R:6R]-inositol produces 5-[2-amino-2,3,4,6-tetradeoxy-4-acetamido-α-D-arabino-hexopyranosyl]-[1R:2S:3S:4R:5R:6R]-inositol. The product is identical to that prepared in Example 10.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. A compound having the formula

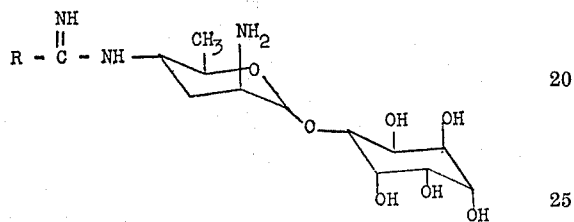

wherein R is hydrogen or (lower)alkyl; and the pharmaceutically acceptable nontoxic salts thereof.

2. A compound having the formula

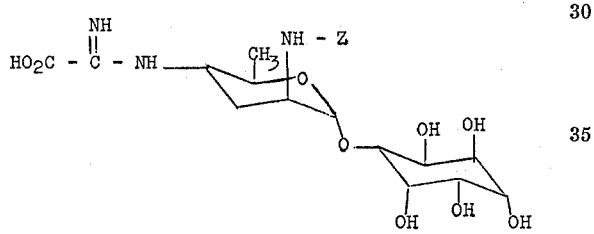

wherein Z is the ketonic residue having the formula

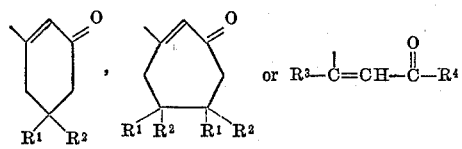

in which $R^1$, $R^2$, $R^3$ and $R^4$ are alike or different and each is hydrogen or (lower)alkyl.

3. The compound of claim 2 having the formula

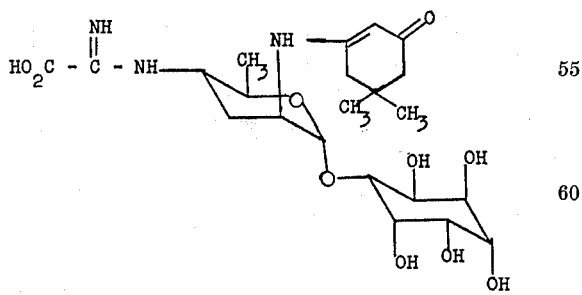

4. A compound having the formula

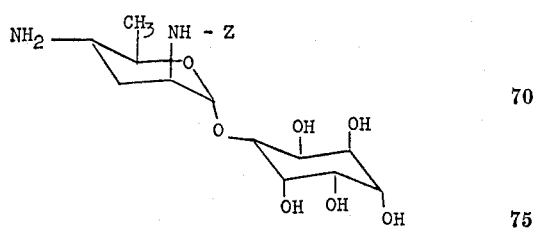

wherein Z is the ketonic residue having the formula

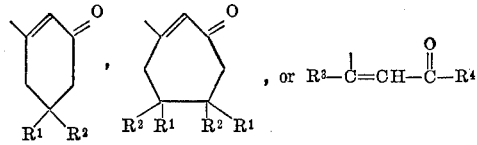

in which $R^1$, $R^2$, $R^3$ and $R^4$ are alike or different and each is hydrogen or (lower)alkyl.

5. The compound of claim 4 having the formula

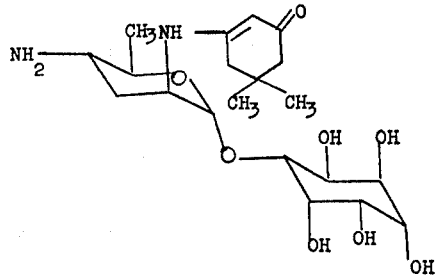

6. A compound having the formula

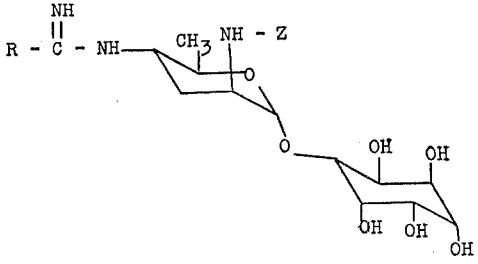

wherein R is hydrogen or (lower)alkyl and Z is the ketonic residue having the formula

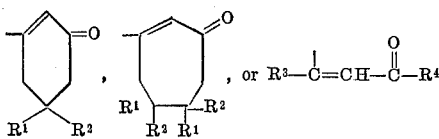

in which $R^1$, $R^2$, $R^3$ and $R^4$ are alike or different and each is hydrogen or (lower)alkyl.

7. The compound of claim 6 having the formula

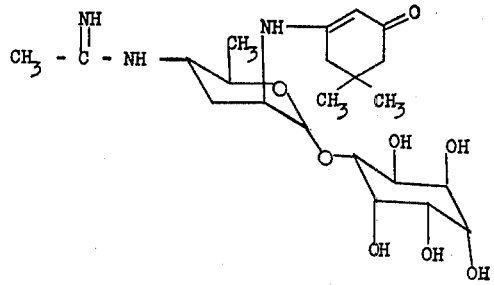

8. The compound of claim 1 having the formula

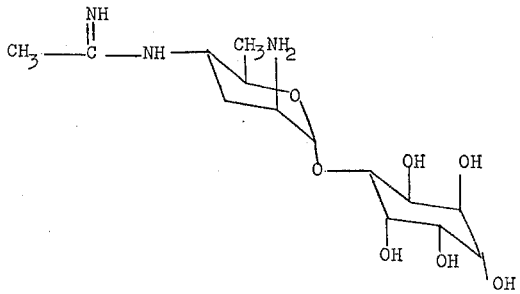

or a pharmaceutically acceptable nontoxic salt thereof.

9. The dihydrochloride salt of the compound of claim 8.

10. The monohydrochloride salt of the compound of claim 8.
11. The compound having the formula
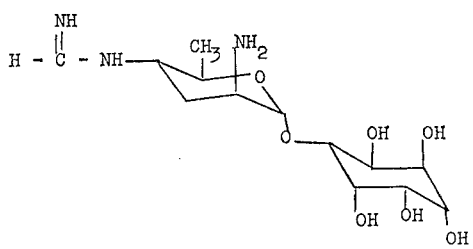
or a pharmaceutically acceptable nontoxic salt thereof.
References Cited
UNITED STATES PATENTS
3,358,001  12/1967  Hamao et al. _____ 260—345.71
OTHER REFERENCES
Tanaka et al.: "Jour. Antibiotics Ser. A," vol. XIX, No. 2 (1966), pp. 65–66.
LEWIS GOTTS, Primary Examiner
J. R. BROWN, Assistant Examiner
U.S. Cl. X.R.
195—80; 424—180